United States Patent [19]
Hahn et al.

[11] 4,455,672
[45] Jun. 19, 1984

[54] CASSETTE HOLDER FOR AN X-RAY EXAMINATION APPARATUS

[75] Inventors: Alfred Hahn; Manfred Boegl, both of Erlangen; Werner Rauch, Nuremberg, all of Fed. Rep. of Germany

[73] Assignee: Siemens Aktiengesellschaft, Berlin and Munich, Fed. Rep. of Germany

[21] Appl. No.: 385,833

[22] Filed: Jun. 7, 1982

[30] Foreign Application Priority Data
Jun. 25, 1981 [DE] Fed. Rep. of Germany ....... 3125015

[51] Int. Cl.³ .......................................... G03D 41/16
[52] U.S. Cl. ..................................... 378/181; 378/210
[58] Field of Search ................................ 378/181, 167

[56] References Cited
U.S. PATENT DOCUMENTS

| | | | |
|---|---|---|---|
| 1,658,833 | 2/1928 | Bucky | 378/181 |
| 3,518,435 | 6/1970 | Kok | 378/181 |
| 3,771,781 | 11/1973 | Lackey et al. | 269/218 |
| 3,792,283 | 2/1974 | Lebra | 378/181 |
| 3,826,922 | 7/1974 | Ingles | 378/181 |
| 3,968,375 | 7/1976 | Peyser et al. | 250/468 |
| 3,976,887 | 8/1976 | Holzermer et al. | 250/468 |

Primary Examiner—Craig E. Church
Attorney, Agent, or Firm—Hill, Van Santen, Steadman & Simpson

[57] ABSTRACT

In an exemplary embodiment at least one pair of oppositely adjustable clamping jaws are to be controlled. In the case of some examinations the cassette holder is not to be greater than the smallest x-ray film cassette to be clamped by it in order to avoid obstructions in the application of the clamped x-ray film cassette to the patient (e.g. axilla region or neck region). To this end, the disclosure provides that an adjustment handle, displaceable on the housing of the cassette holder, is coupled with a slide which is displaceable in the housing and connected with a clamping jaw, and that the latter slide is coupled with the one end of a two-arm lever whose other end is connected with a clamping jaw. Such a cassette holder is particularly suited for use in the case of x-ray examination apparatus.

8 Claims, 2 Drawing Figures

CASSETTE HOLDER FOR AN X-RAY EXAMINATION APPARATUS

BACKGROUND OF THE INVENTION

The invention relates to a cassette holder for an x-ray examination apparatus, comprising at least one pair of oppositely adjustable clamping jaws for the centric clamping-in of x-ray film cassettes of varying format, and comprising at least one spring drawing the clamping jaws toward one another.

In the case of x-ray examination apparatus it is generally known to centrically clamp-in x-ray film cassettes of varying format on a cassette plate most frequently insertable beneath the examination table. To this end, U.S. Pat. No. 3,771,781 discloses how two clamping jaws can be adjusted via two pairs of oppositely adjustable toothed racks. In this construction, the outlay of four toothed racks and two pinions for the opposite adjustment of a pair of clamping jaws is considerable. Also, such a clamping device, as a consequence of its large dimensions, is not very well suited for the support-mounting of cassettes which, for example, in the case of accident patients, are to be brought to application directly on the body, particularly also on body recesses of the patient such as the axilla region or the neck region.

SUMMARY OF THE INVENTION

An object underlying the invention resides in constructing a cassette holder which can be kept smaller on three sides than the smallest cassette to be clamped. It is to be comfortable in its handling and reliable and simultaneously economical in its construction.

In the case of a cassette holder of the type initially cited, therefore, in accordance with the invention, an adjusting handle, displaceable on the housing of the cassette holder, is coupled with a slide, displaceable in the housing, connected with a clamping jaw, and the latter slide is coupled with one end of a two-arm lever whose other end is connected with a clamping jaw disposed opposite the first-cited clamping jaw. This type of cassette clamping can be constructed in a very space-economizing fashion and therefore need not project beyond the clamped cassette on the sides, which is of benefit to the application of the same on the body of the patient. Through the utilization of an adjustment handle the just-clamped-in x-ray film cassette can be released in the simplest fashion and removed and replaced by another x-ray film cassette provided with a new film sheet. In addition, the utilization of a two-arm lever, pivotally mounted in the housing, as the adjustment element, is relatively simple, economical and reliable.

Further details of the invention shall be explained on the basis of an exemplary embodiment illustrated in the Figures on the accompanying drawing sheets; and other objects, features and advantages will be apparent from this detailed disclosure and from the appended claims.

DETAILED DESCRIPTION

Figure 1:
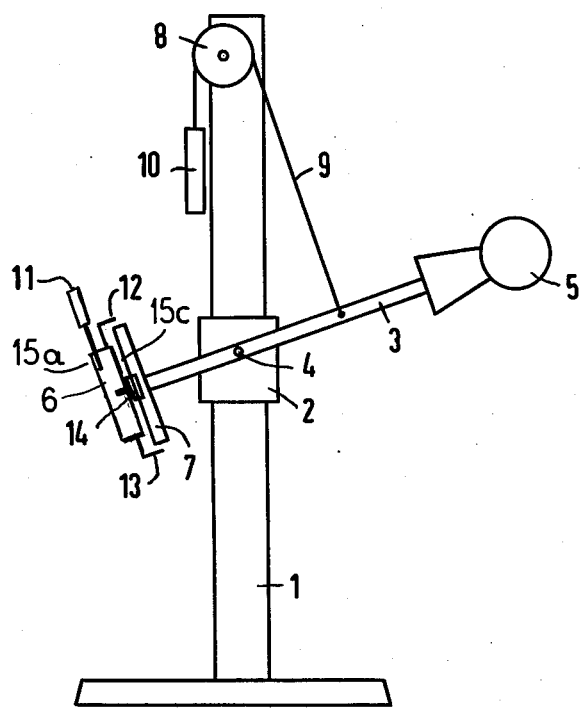
FIG. 1 shows an x-ray examination apparatus comprising a cassette holder mounted on a support column.

FIG. 1 illustrates a support column 1 on which a longitudinally movable carriage 2 is height-adjustably mounted. On the longitudinally movable carriage a support 3 is pivotally mounted for pivotal movement about a horizontal axis 4. At one end of this support 3 an x-ray tube 5 is mounted and, at the opposite end in alignment with the tube 5, a holder 6 for an x-ray film cassette 7 is mounted. The weight of the longitudinally running carriage 2, the support 3, the x-ray tube 5 and the cassette holder 6 are compensated by a counterweight 10 suspended on a cable line 9 guided via a cable pulley 8. On the cassette holder 6 one recognizes an adjusting handle 11 and an x-ray film cassette 7 which is to be clamped between clamping jaws such as 12, 13, 14.

Figure 2:
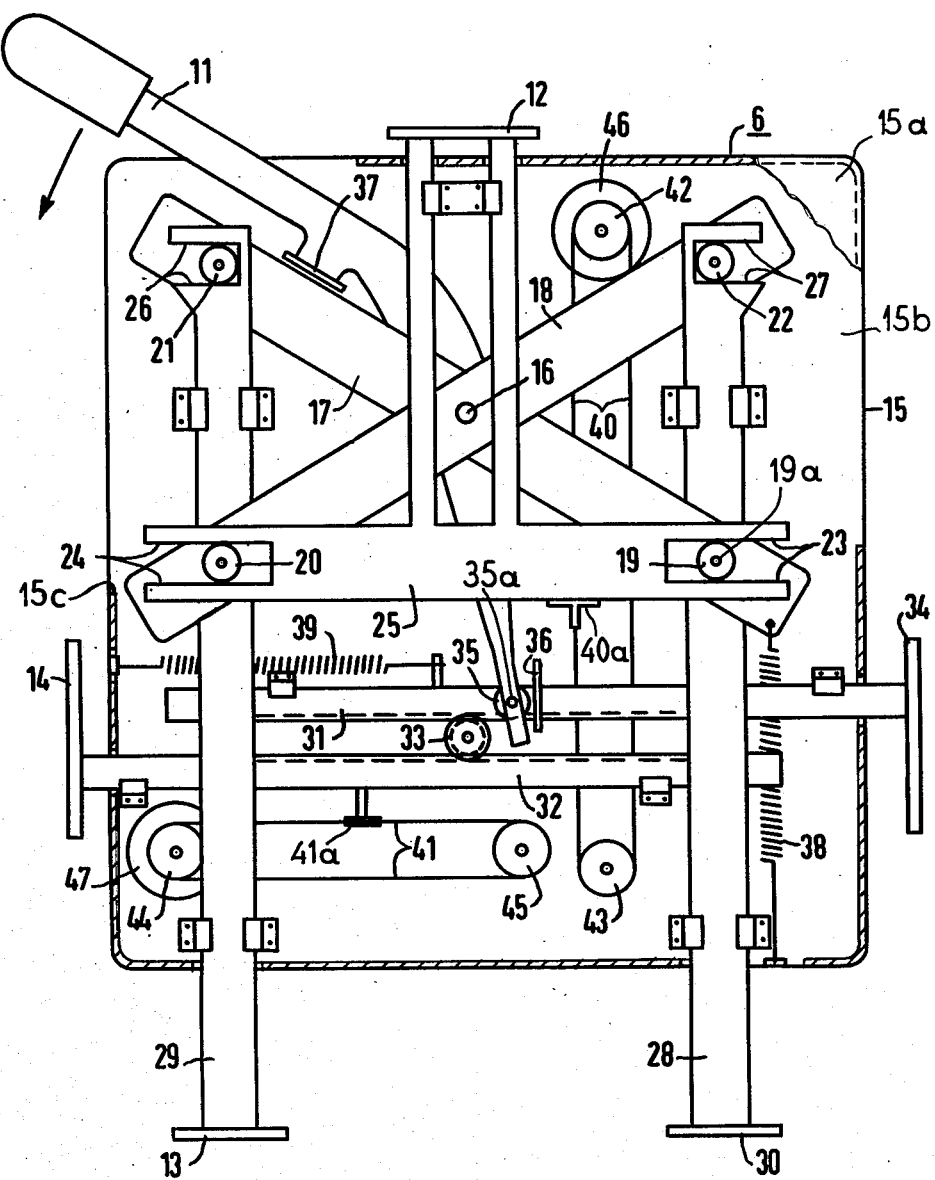
FIG. 2 illustrates a plan view of the cassette holder with opened housing.

FIG. 2 shows the cassette holder 6 in plan view. The front cover plate is removed for the representation of the internal construction. The adjusting handle 11, projecting laterally from the housing 15, is pivotal about a central axis 16 aligned perpendicularly to the cassette plane. Rotatably mounted about the same axis 16 are also additionally two two-arm levers 17 and 18. The latter bear at their free ends one rotary bearing 19, 20, 21, 22 each. Each of the bearings has a central axle such as 19a mounting the bearing on the associated end of a lever such as 19. Each bearing may have a cylindrical or a spherical exterior surface configuration. The lower bearings 19, 20, in the illustration of FIG. 2, of the two two-arm levers 17, 18, run in recesses 23, 24 at the bifurcated ends of a slide or actuating frame 25, is reciprocally mounted by housing 15. The slide 25 is directly connected with the upper clamping jaw 12 in FIG. 2. The upper bearings 21, 22 in the illustration of FIG. 2, of the two two-arm levers 17, 18, run in lateral recesses 26, 27 near the ends of two clamping jaw supports 28, 29, which are displaceable oppositely relative to the slide 25. The latter clamping jaw supports 28, 29 bear at their respective opposite ends one clamping jaw 13, 30 each (which project beyond the cover of the cassette holder as can be seen in FIG. 1).

In the housing 15 of the cassette holder 6, moreover, below slide 25, two racks 31, 32 are displaceably mounted transversely to the adjustment direction of the slide 25. The teeth of racks 31, 32 mesh with a pinion 33 which is rotatably mounted between them in the housing 15 of the cassette holder 6. Each of the two racks 31, 32 bears at a respective end one clamping jaw 14, 34 each. The adjusting handle 11 is designed as a two-arm lever. At its end opposite the handle side it bears a rotary bearing 35 mounted by an axle 35a. The bearing 35 has rolling engagement with a track element 36 on one of the two racks, 31. On the handle-side leg of the adjusting handle 11 an abutment element 37 can be recognized which enters into engagement with one of the two two-arm levers, 17 during the adjustment of the adjusting handle in the direction of the arrow in FIG. 2. The two-arm lever 17, capable of being brought into engagement with the adjusting handle 11, and one of the two racks, 31, are drawn into an extreme position by one tension spring 38, 39 each, (in which position the respective clamping jaws have the least mutual distance). The slide 25 and the one rack 32 are each respectively connected with a coupling part 40a, 41a secured to an endless toothed belt 40, 41. The toothed belts are guided via two deflection rollers 42, 43, 44, 45 each, of which the one deflection roller 42, 44, respectively, is connected with an actual value transmitter (position transducer) 46, 47, for example, a potentiometer.

For inserting an x-ray film cassette 7 of any desired format it suffices to pivot the adjustment lever 11 around in the arrow direction. The adjustment lever thus rotates with its abutment element 37 the one two-arm lever 17 in a counter-clockwise direction about the common axis 16. The two-arm lever 17 with its lower bearing 19 at the right in FIG. 2, upwardly displaces the upper clamping jaw 12. The slide 25 thus also entrains the bearing 20 of the other two-arm lever 18 so that the opposite, upper bearings 21, 22 in FIG. 2 of the two-arm levers 17, 18, downwardly entrain the two clamping jaw supports 28, 29 for extending the lower clamping jaws 13, 30, in an opposite direction, e.g. downwardly in the representation of FIG. 2. Simultaneously, the end of the adjustment handle 11, opposite the handle, with the bearing 35 mounted there, presses the track element 36 mounted on the upper rack 31 together with the latter rack to the right in FIG. 2. Thus the clamping jaw 34 mounted on the rack 31 is pressed exteriorly to the right as viewed in FIG. 2. This movement entrains, via the pinion 33, the opposite rack 32 with the left clamping jaw 14 and extends the jaw 14 in the opposite direction. This has the result that all clamping jaws 12, 13, 14, 30, 34, through actuation (depression) of the adjustment lever 11 in the arrow direction, are separated from one another counter to the force of the two tension springs 38, 39. An x-ray film cassette possibly clamped between them is released in this fashion. At the same time a new x-ray film cassette can be inserted between the clamping jaws. As soon as this has taken place, upon pivoting back of the adjustment handle 11 counter to the arrow direction (or upon releasing of the actuating pressure on the handle), the tension springs 38 and 39 can again draw the two sets of cooperating clamping jaws toward one another. Thus also the adjustment handle 11, through the element 37 and/or 36, is rotated back toward its initial position. The two tension springs 38, 39 then securely hold the clamped x-ray film cassette 7 on the cassette holder 6.

As a consequence of the compulsorily oppositely acting adjustment of the clamping jaws which are disposed opposite one another, respectively, an exactly centric clamping of x-ray film cassettes of any desired format is achieved. The position of the actual value transmitters 46 and 47 entrained by the toothed belts, corresponds to the width and height of the respectively clamped x-ray film cassette. Its electric values can be employed, for example, for controlling the aperture of a primary x-ray beam delimiting diaphragm.

It will be apparent that many modifications and variations may be made without departing from the scope of the teachings and concepts of the present invention.

SUPPLEMENTARY DISCUSSION

In FIG. 1, reference numeral 15a may be taken as referring to a cover which overlies the cassette holder mechanism seen in FIG. 2. The cassette 7 may rest directly on the surface of cover 15a when fully inserted between the clamping jaws. In the position of the cassette holder mechanism shown in FIG. 2, rotary bearings 21 and 22 are at an extreme position in slots 26 and 27, so that the first holder linkage associated with the jaws 12, 13, 30 is constricted as far as possible. The separation between clamping jaw 12 and clamping jaws 13 and 30 is thus slightly less than a first minimum dimension of a minimum dimension cassette. The second holder linkage associated with the clamping jaws 14 and 34 is separately actuated by spring 39. Thus it may be assumed that clamping jaws 14 and 34 are not yet at their minimum separation and will be moved further toward each other by the spring 39 in the absence of actuating force on handle 11. This further movement will move the handle 11 clockwise to its initial position where abutment element 37 has a greater spacing from lever 17.

Continued rotation of the handle 11 in the counter-clockwise direction as indicated by the arrow in FIG. 2 spreads both sets of clamping jaws to respective maximum separation distances corresponding to maximum cassette dimensions. The cassette to be clamped may have any desired shape just so its dimensions fit within the respective ranges of the two sets of clamping jaws. For a relatively long or high cassette jaws 12 and 13, 30 can have their maximum separation while jaws 14 and 34 are allowed to move as far together as necessary to clampingly engage the width dimension of the cassette. Conversely for a relatively wide cassette, the jaws 14 and 34 may have a maximum separation, while spring 38 holds clamps 12 and 13, 30 at a relatively small spacing so as to clampingly engage the relatively small height dimension. The cover 15a may have a side wall secured to mounting plate 15b and the side wall may have a lateral aperture at 15c accomodating movement of the left hand ends of levers 17 and 18 toward each other to a greater degree. The other three sides of the cassette holder are shown as essentially enclosed by the housing 15. The dimensions of housing 15 as seen in FIG. 2 fit laterally within the confines of a minimum size cassette. In FIG. 2 the clamping jaws themselves are external to the housing 15 and project above cover 15a as shown for clamp 12 in FIG. 1. The height of each clamp above the plane of the top of the cover 15a may be slightly less than the thickness dimension of a minimum thickness cassette 7, so that essentially only the cassette itself lies above the plane of the top of the cover. The showing in FIG. 1 is diagrammatic as to the positions of clamps 12 and 13, and these clamps may have actual positions in relation to the housing 15 as determined by the linkage mechanism of FIG. 2. Also aperture 15c is only diagrammatically indicated in FIG. 1. The housing may be enlarged to accomodate full movement of levers 17 and 18, and/or the levers may terminate near the mounting of rotary bearings 20 and 21 so as to fit fully within housing 15. In any event the housing is of smaller height and width dimensions than the corresponding minimum cassette dimensions.

We claim as our invention:

1. A cassette holder assembly for an x-ray examination apparatus, comprising a housing, cassette holder means associated with the housing and having oppositely adjustable clamping jaw means for the centric clamping of x-ray film cassettes of varying format, and spring means for drawing the clamping jaw means toward one another, an actuating handle (11) displaceable on the housing (15) of the cassette holder means (6), an actuating frame (25) movably mounted by the housing and coupled with the handle (11) for movement in a given direction when manual force is applied to the handle (11) for the purpose of moving the clamping jaw means toward a release condition, said clamping jaw means comprising a first clamping jaw (12) connected with the actuating frame (25) for movement toward a release condition as the actuating frame is moved in the given direction, and lever means comprising a lever (17)

pivotally mounted on the housing intermediate the ends of said lever and having a first end coupled with the actuating frame and having a second end for moving oppositely to the actuating frame, said clamping jaw means comprising a second clamping jaw (13) disposed opposite the first clamping jaw (12) and coupled with the second end of the lever (17) so as to move oppositely to the first clamping jaw as the actuating frame is moved in said given direction, said handle thereby being manually actuatable to move the first and second clamping jaws away from each other against the action of said spring means.

2. A cassette holder assembly according to claim 1, characterized in that said lever means comprises a pair of levers (17, 18) pivotally mounted centrally of the housing and having respective first ends coupled with the actuating frame and having respective second ends for moving oppositely to the actuating frame, said clamping jaw means comprising respective second clamping jaws (13, 30) disposed opposite the first clamping jaw (12) and coupled with the respective second ends of said levers (17, 18) so as to move oppositely to said first clamping jaw (12) as the actuating frame is moved in said given direction.

3. A cassette holder assembly according to claim 2 with said actuating frame having elongated recesses (23, 24) disposed transversely to said given direction of movement, the first ends of said levers having respective rotary bearings (19, 20) engaging in the respective recesses so as to couple the levers with said actuating frame.

4. A cassette holder assembly according to claim 2 with said actuating handle (11) having means (37) engageable with one of said levers for moving the handle in a direction opposite to said given direction when the handle is released to allow clamping of a cassette by said clamping jaws.

5. A cassette holder assembly according to claim 1, characterized in that said clamping jaw means comprises a set of additional clamping jaws (14, 34) movable at a right angles to the first and second clamping jaws (12, 13, 30), and coupled with the actuating handle (11) for movement away from each other in response to manual actuation of said handle.

6. A cassette holder assembly according to claim 5, characterized in that racks (31, 32) mount the respective additional clamping jaws (14, 15), and pinion means (33), meshing with the racks, is rotatably mounted in the housing (15) so as to require coordinated opposite movement of said additional clamping jaws.

7. A cassette holder assembly according to claim 1, with a cable line connected with the clamping jaws for movement in accordance with the separation thereof, and means coupled with said cable line for driving a position transducer for the control of the size of the radiation beam impinging on the cassette receiving region of said cassette holder means.

8. A casseette holder assembly for an x-ray examination apparatus, comprising a mounting plate having a rectangular area with first and second dimensions essentially corresponding to a minimum size of cassette, a cassette holder mechanism mounted on said mounting plate and having respective first and second sets of oppositely moving clamping jaws with first and second minimum separation distances therebetween not less than said first and second dimensions, first and second spring means acting on said first and second sets of clamping jaws respectively for urging the clamping jaws toward each other so that said first and second sets of clamping jaws have said first and second minimum separation distances therebetween in the absence of a cassette therebetween, an actuating handle coupled with cassette holder mechanism and pivotally mounted on said mounting plate for movement in a plane adjacent and parallel to said mounting plate, a cover cooperating with said mounting plate to enclose said cassette holder mechanism and providing a cassette confronting external surface defining with the clamping jaws a cassette receiving space overlying said cover, the clamping jaws projecting laterally beyond said external surface of the cover so as to be engageable with the margins of a cassette inserted into the cassette receiving space, the cassette holder mechanism having first and second motion coordinating mechanisms carrying the first and second sets of clamping jaws respectively and actuatable by the handle to move the first and second sets of clamping jaws to first and second maximum separation distances greater than first and second maximum cassette dimensions against the action of said first and second spring means respectively, said first and second sets of clamping jaws being independently urged by the first and second spring means, and the handle having one-way coupling with the first and second motion coordinating mechanisms such that the first and second sets of clamping jaws can clampingly retain cassettes of different shapes at said cassette receiving space.

* * * * *